Dec. 28, 1954     W. F. PERKINS     2,698,042

AIR-SEALING TIRE LINER

Filed Sept. 13, 1950

Inventor
William F. Perkins
By [signature]
Atty.

United States Patent Office 2,698,042
Patented Dec. 28, 1954

2,698,042

AIR-SEALING TIRE LINER

William F. Perkins, Cuyahoga Falls, Ohio, assignor to The B. F. Goodrich Company, New York, N. Y., a corporation of New York Application September 13, 1950, Serial No. 184,583

3 Claims. (Cl. 152—362)

This invention relates to a tire liner which makes possible inflation of the tire without an inner tube. By eliminating the need for an inner tube difficulties such as tube chafing, tube pinching and tearing of the valve from the tube which are encountered in the operation of tires with inner tubes are eliminated.

Attempts to use without an inner tube an ordinary tire casing constructed for use with an inner tube have presented a serious difficulty because the air penetrates through the ordinary rubber of the tire wall into the fabric plies causing pocketing of the air, formation of blisters, separation of the plies and failure of the tire. This is a difficulty not usually encountered when a tire is used with an inner tube because the air which diffuses slowly through the inner tube can escape through the space between the inner tube and the tire casing and out between the bead portion and rim or around the valve stem.

The advantages of tire operation without an inner tube may be had with an ordinary tire casing by utilizing a sealing liner constructed and mounted in accordance with this invention which covers the inner face of the tire without requiring adhesion of the liner to the tire wall, and provides a wall of material having low air permeability for retaining air in the tire. The sealing liner is mounted on the tire casing in a manner such that it remains in place during operation and may be easily removed to permit repair and replacement. The tire casing and liner may be mounted on a conventional wheel rim without special tools and the sealing liner provides a fluid seal between the bead portions of the tire casing and the wheel rim to prevent the escape of air at the rim-sealing faces of the tire bead portions.

Objects of this invention are to provide a sealing tire liner adapted for mounting in a rim-mounted tire to eliminate the need for an inner tube, to provide for avoiding the necessity for adhesion of the liner to the tire wall, to provide for a low rate of diffusion of air through the liner and through the tire casign, to provide effectively for adapting ordinary tire casings for use without requiring an inner tube, to provide for securely mounting the liner in the tire without requiring permanent attachment to the tire, to provide a fluid seal between the bead portions of the tire and the rim and to provide for simplicity of construction and for convenience of installation.

These and other objects will be apparent from the following description, reference being had to the drawings in which.

Figure 2A:
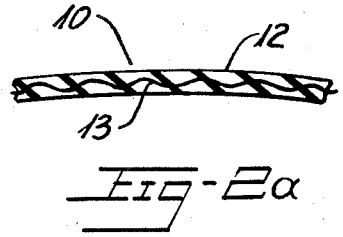
Fig. 2a is a fragmentary view showing a preferred liner material in cross section drawn to an enlarged scale.
Figure 1:
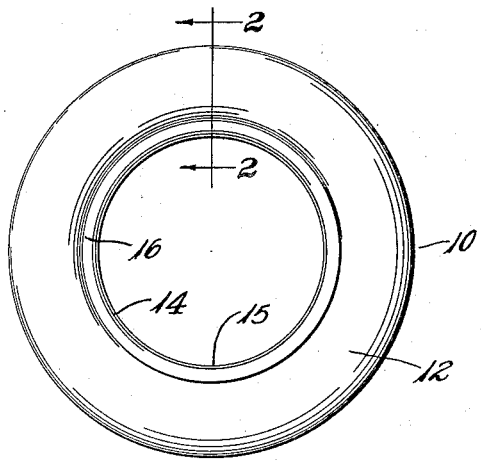
Fig. 1 is an elevation of the tire liner constructed in accordance with and embodying the invention.
Figure 2:
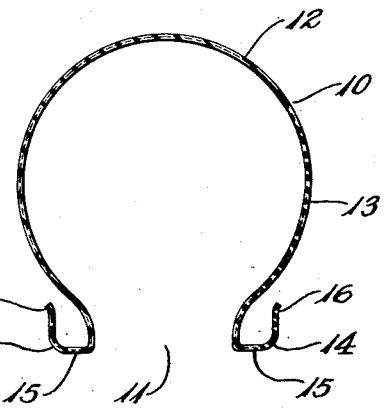
Fig. 2 is a section taken along the line 2—2 of Fig. 1.

Referring to the drawings and especially to Figs. 1 and 2 a tire liner 10 is shown which has an annular and hollow toroidal shape conformable to the contour of the inner toroidal surface of a tire. A continuous circumferential opening 11 at the inner periphery of the liner 10 provides communication between the rim and the enclosed cavity. The liner 10 has a wall of resilient stretchable flexible sheet material and consists of butyl-type rubber having a low rate of diffusion of air for retaining the air in the tire. The liner 10 may be used in the unreinforced condition, but if desired, one or more plies of fabric 13 such as bias laid woven cord fabric or more stretchable fabric such as stockinet may be embedded in the wall 12. If the fabric reinforcement 13 is used the butyl-type rubber may be applied to both sides of the ply by friction calendering so that the fabric is entirely embedded in the rubber and is not exposed. It is desirable that the liner 10 be somewhat stretchable so that it may be distended to conform closely to the contour of the tire casing and provide a smooth fit without undesirable wrinkles.

The liner 10 is formed and cured in any suitable manner such as by molding. Margins 14, 14 at the inner periphery of the liner 10 are molded in a folded disposition and are folded axially outward from the liner wall 12 forming base portions 15, 15. At a distance from the wall 12 which is equal to substantially the width of a tire bead portion of the tire for which the liner is made, the margins 14, 14 may be molded to fold substantially radially outward to form lip portions 16, 16. It is preferable that the lip portions 16, 16 extend radially outward from the base portions 15, 15 a distance which is approximately equal to but less than the width of the radially extending flanges of the wheel rim against which the lips are held in operation. As shown in the drawings the lips 16, 16, base portions 15, 15 and wall 12 of the tire liner 10 form circumferential channels for accommodating bead portions of the tire for which the tire liner is made.

Figure 3:
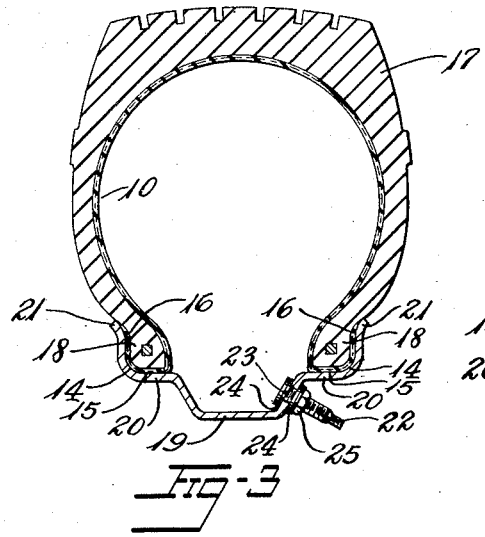
Fig. 3 is a section like Fig. 2, the relative positions of the tire and wheel rim being shown.

Referring to Fig. 3 the tire liner 10 is shown mounted on a tire 17 of toroidal shape having a hollow circumferential body with outwardly bowed side walls terminating in inextensible reinforced bead portions 18, 18. The bead portions of the tire as shown in Fig. 3 are arranged in parallel relation and the side walls of the tire are more widely spaced than the bead portions so that inflation of the tire will urge the bead portions outwardly against the rim flanges. The liner 10 and tire 17 are mounted on an annular wheel rim 19 which may be of the drop center type and have axially extending flanges 20, 20 and radially extending flanges 21, 21. A valve 22 is mounted in an aperture 23 in the rim 19 and has washers 24, 24 at the aperture for preventing passage of air between the rim and the valve. A nut 25 is threaded on the valve 22 for clamping the washers 24, 24 against the rim 19 and for securing the valve to the rim.

In operation the liner 10 is placed in the tire casing 17 and the margins 14, 14 are folded and snapped over the bead portions 18, 18 of the tire. The tire is mounted on the rim 19 with the base portions 15, 15 disposed between the bead portions 18, 18 and the axially extending flanges 20, 20 of the rim and with the lips 16, 16 of the tire liner disposed between the bead portions 18, 18 of the tire 17 and the radially extending flanges 21, 21 of the rim. The tire is inflated by a suitable fluid such as air which is introduced through valve 22 and is retained in the tire 17 by the tire liner 10 and the rim 19. The resilient rubber-like material of the liner 10 at the inner surface of the tire 17 is resistant to diffusion of air so that penetration of air into the casing body is substantially avoided. This same resilient material at the marginal base portions 15, 15 and at the lips 16, 16 seals the space between the bead portions 18, 18 of the tire 17 and at the same time retains the liner in position in the tire.

As the inflation pressure is increased the seal between the rim 19 and tire 17 is increased by outward pressure of the air at the bead portions of the tire and the tire liner 10 is held with greater force because the bead portions 18, 18 are urged against the rim with greater force. This is especially true of the lips 16, 16 of the liner 10 which are clamped between the radially extending flanges 21, 21 of the rim 19 and the bead portions 18, 18 of the tire 17.

The sealing tire liner 10 may be removed from the tire by deflating the tire and removing one of the bead portions of the tire 17 from the rim 19. One of the lips 16, 16 of the liner margin 14 is then unfolded from the bead portion which is removed from the rim and the entire liner 10 is pulled from the tire.

Figure 4:
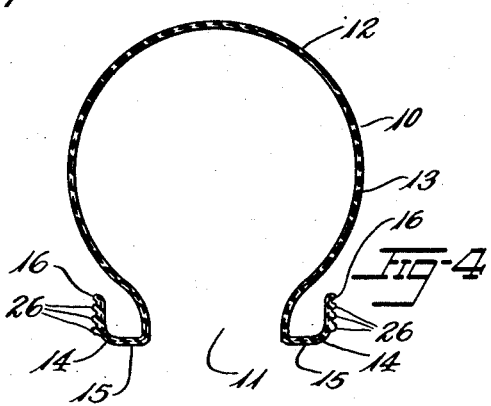
Fig. 4 is a view like Fig. 2 but showing a modified construction.

Referring to Fig. 4 a modification is shown in which the lips 16, 16 are formed with a plurality of circumferential ribs 26, 26 at the rim-engaging face to provide an improved air seal between the tire and the rim. These ribs 26, 26 are preferably of resilient rubber material such as the butyl-type rubber of the liner 10 molded integrally with the lips 16, 16 of the liner, and in operation are urged in the axially outward direction against the rim flange 21 by the inflation pressure within the tire. The ribs 26, 26 are spaced-apart radially of the tire to permit distortion of the material of the rib into the zones between the ribs thereby increasing the ability of the ribs to conform to the face of the rim flange 21 for effective sealing despite irregularities which may be present in the flange surface.

If desired the sealing tire liner may be adhered to the inner face of the tire 17 or to the bead portions 18, 18 or to both although with the construction described and shown adhesion is not necessary, the liner being maintained in position especially by its conforming shape.

Variations may be made without departing from the scope of the invention as it is defined in the following claims.

I claim:

1. A tire and rim assembly comprising a wheel rim having an axially extending flange and a radially extending flange at each of the peripheral margins of the rim; a pneumatic tire casing on said rim, the tire casing having an open-bellied hollow annular body including a peripheral tread portion and side walls terminating in laterally spaced annular bead portions which are received by said flanges, each side wall being bowed outwardly from the other between its respective bead portion and the tread portion and the side walls being formed of reinforced rubber material of comparatively low resistance to air diffusion; and an annular circumferentially-continuous endless open-bellied tire liner of thin flexible butyl-type rubber sheet material highly resistant to diffusion of air as compared to said rubber material of the tire casing, the liner being independent from the structure of the tire casing and having a substantially toroidal body preformed to the shape and dimensions corresponding to the size and curvature of the internal surface of the tire casing so that the body of the liner in its uninflated condition conforms to the internal surface of the tire casing throughout the extent of such surface, said body of the liner terminating in axially-spaced inner marginal edges adjacent the toes of said bead portions of the tire, an annular endless flange portion extending axially outward from each of said marginal edges of the liner between said axial flanges of the rim and the bead portions, and an annular lip extending radially outward from the outer margin of each said flange of the liner between said radial flanges of the rim and the heels of said bead portions of the tire casing; said body of the liner and the portions of the rim exposed between the bead portions of the tire forming an airtight chamber to receive air for inflating the tire, and said lips and said flanges of the liner being preformed to the size and curvature of the bead portions and being squeezed between the adjacent portions of the rim flanges and the bead portions upon inflation of the tire to provide a fluid seal between the rim and the bead portions.

2. A tire and rim assembly in accordance with claim 1 in which said lips are provided with circumferentially continuous ribs of resilient rubber material deformable into sealing engagement against said radial flanges of the rim upon inflation of the tire.

3. A tire and rim assembly in accordance with claim 1 in which the body portion of the liner is formed with flexible fabric throughout its circumferential extent having a layer of butyl-type rubber covering said fabric on the side of said body exposed to the pressure of the inflation air.

References Cited in the file of this patent

UNITED STATES PATENTS

| Number | Name | Date |
| --- | --- | --- |
| 1,462,517 | Marquette | July 24, 1923 |
| 1,463,742 | Lane | July 31, 1923 |
| 1,653,054 | Mack | Dec. 20, 1927 |
| 1,923,975 | Harlan | Aug. 22, 1933 |
| 2,074,284 | Stevenson | Mar. 16, 1937 |
| 2,410,209 | Godsey | Oct. 29, 1946 |
| 2,526,997 | Davis | Oct. 24, 1950 |
| 2,534,252 | Engler | Dec. 19, 1950 |
| 2,587,470 | Herzegh | Feb. 26, 1952 |

FOREIGN PATENTS

| Number | Country | Date |
| --- | --- | --- |
| 42,198 | Denmark | Apr. 29, 1930 |
| 122,731 | Australia | July 22, 1944 |
| 621,146 | Great Britain | Apr. 5, 1949 |